United States Patent
Ghosh et al.

(10) Patent No.: US 10,127,181 B2
(45) Date of Patent: Nov. 13, 2018

(54) PORT DISCONNECT CHARGING FUNCTION FOR USB HUB

(71) Applicant: Microchip Technology Incorporated, Chandler, AZ (US)

(72) Inventors: Atish Ghosh, Austin, TX (US); Donald L. Perkins, Madison, AL (US); Brigham Steele, San Tan Valley, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 376 days.

(21) Appl. No.: 14/699,700

(22) Filed: Apr. 29, 2015

(65) Prior Publication Data
US 2015/0318728 A1 Nov. 5, 2015

Related U.S. Application Data

(60) Provisional application No. 61/986,240, filed on Apr. 30, 2014.

(51) Int. Cl.
*G06F 13/42* (2006.01)
*H02J 7/00* (2006.01)

(52) U.S. Cl.
CPC ........ *G06F 13/4282* (2013.01); *H02J 7/0052* (2013.01); *G06F 2213/0042* (2013.01); *G06F 2213/3812* (2013.01)

(58) Field of Classification Search
CPC .............. G06F 13/385; G06F 13/387; G06F 2213/0042; G06F 2213/4002; G06F 2213/4004; G06F 13/4282; G06F 2213/3812; H01L 12/40123
See application file for complete search history.

(56) References Cited

U.S. PATENT DOCUMENTS

| | | | |
|---|---|---|---|
| 5,675,813 A | 10/1997 | Holmdahl | 713/310 |
| 5,784,581 A | 7/1998 | Hannah | 710/110 |
| 5,845,329 A | 12/1998 | Onishi et al. | 711/157 |
| 6,119,190 A | 9/2000 | Garney | 710/310 |
| 6,147,682 A | 11/2000 | Kim | 345/211 |
| 6,205,501 B1 | 3/2001 | Brief et al. | 710/100 |
| 6,308,239 B1 | 10/2001 | Osakada et al. | 710/316 |
| 6,408,351 B1 | 6/2002 | Hamdi et al. | 710/63 |
| 6,408,367 B2 | 6/2002 | Achilles et al. | 711/157 |
| 6,516,205 B1 | 2/2003 | Oguma | 455/557 |

(Continued)

FOREIGN PATENT DOCUMENTS

| | | | | |
|---|---|---|---|---|
| GB | 2352540 A | 1/2001 | | G06F 13/40 |
| JP | 2003256351 U | 9/2003 | | G06F 13/14 |
| WO | 2005/018124 A1 | 2/2005 | | H04J 3/24 |

OTHER PUBLICATIONS

International Search Report and Written Opinion, Application No. PCT/US2015/028479, 9 pages, dated Jul. 13, 2015.

(Continued)

*Primary Examiner* — Drew A Dunn
*Assistant Examiner* — Sailesh Thapa
(74) *Attorney, Agent, or Firm* — Slayden Grubert Beard PLLC

(57) ABSTRACT

A Universal Serial Bus (USB) hub includes a first port that is configured to be switched from a downstream port to an upstream port; a plurality of other ports; and a controller configured to switch a function of the first port from the downstream port to the upstream port responsive to a command from an attached device and further configured to switch at least one of the plurality of other ports from a data and charge port into a port dedicated to charging.

25 Claims, 4 Drawing Sheets

(56) References Cited

U.S. PATENT DOCUMENTS

| | | | |
|---|---|---|---|
| 6,532,512 B1 | 3/2003 | Torii et al. | 710/316 |
| 6,549,966 B1 | 4/2003 | Dickens | 710/300 |
| 6,601,109 B1 | 7/2003 | Bealkowski et al. | 709/250 |
| 6,704,824 B1 | 3/2004 | Goodman | 710/300 |
| 6,725,302 B1 | 4/2004 | Benayoun et al. | 710/62 |
| 6,732,218 B2 | 5/2004 | Overtoom et al. | 710/313 |
| 6,957,287 B2 | 10/2005 | Lou et al. | 710/72 |
| 7,040,823 B2 | 5/2006 | Silverbrook | 400/419 |
| 7,073,010 B2 | 7/2006 | Chen et al. | 710/313 |
| 7,093,057 B2 | 8/2006 | Choi | 710/313 |
| 7,246,189 B2 | 7/2007 | Ulenas | 710/305 |
| 7,346,728 B1 | 3/2008 | Jackson | 710/313 |
| 7,433,991 B2 | 10/2008 | Fujita et al. | 710/316 |
| 7,478,191 B2 | 1/2009 | Wurzburg et al. | 710/316 |
| 7,480,753 B2 | 1/2009 | Bohm et al. | 710/104 |
| 7,523,243 B2 | 4/2009 | Bohm et al. | 710/305 |
| 7,627,708 B2 | 12/2009 | Bohm et al. | 710/305 |
| 7,711,006 B2 | 5/2010 | Dries et al. | 370/474 |
| 2006/0056401 A1 | 3/2006 | Bohm et al. | 370/360 |
| 2006/0059293 A1 | 3/2006 | Wurzburg et al. | 710/313 |
| 2006/0227759 A1 | 10/2006 | Bohm et al. | 370/351 |
| 2007/0255885 A1* | 11/2007 | Bohm | G06F 13/4022 710/316 |
| 2013/0151731 A1 | 6/2013 | Lai et al. | 710/3 |
| 2014/0019778 A1* | 1/2014 | Lin | G06F 1/266 713/300 |

OTHER PUBLICATIONS

Anonymous, "Universal Serial Bus Specification rv. 2.0," 650 pages, Apr. 27, 2000.

Anonymous, "On-The-Go Supplement to the USB 2.0 Specification, Rev. 1.0," 74 pages, Dec. 18, 2001.

Anonymous, "Microsoft Computer Dictionary, 5th Edition," 3 pages, 2002.

Hyde, John, "USB Design by Example: A Practical Guide to Building I/O Devices," Intel Press: Engineer to Engineer Communication, 30 pages, Apr. 2002.

Anonymous, "CY7C65640: TetraHub™ High-Speed USB Hub Controller," Cypress Semicondutor Corporation, 25 pages, Dec. 5, 2002.

Axelson, Jan, "USB Complete: Everything you Need to Develop Custom USB Peripherals, Third Edition," Lakeview Research LLC, 560 Pages, 2005.

Excerpts of Prosecution File History of Abandoned U.S. Appl. No. 10/940,406, 289 Pages, Jan. 4, 2010.

Excerpts of Prosecution File History of Abandoned U.S. Appl. No. 11/100,299, 165 Pages, Jan. 4, 2010.

Excerpts of Prosecution File History of Abandoned U.S. Appl. No. 11/424,179, 190 Pages, Jan. 4, 2010.

European Office Action, Application No. 15724834.5, 5 pages, dated Dec. 21, 2017.

* cited by examiner

PORT DISCONNECT CHARGING FUNCTION FOR USB HUB

CROSS REFERENCE TO RELATED APPLICATIONS

This application is a conversion of, and claims benefit of priority to, U.S. Provisional Patent Application Ser. No. 61/986,240, filed Apr. 30, 2014, which is hereby incorporated by reference in its entirety as if fully set forth herein.

TECHNICAL FIELD

The present disclosure relates to universal serial bus (USB) technology, in particular, a charging function of USB ports in a USB hub.

BACKGROUND

The Universal Serial Bus (USB) 1.0 specification was originally developed in the 1990s to provide a bus and interface(s) to standardize communication between computers and peripheral devices, such as keyboards, printers, cursor pointing devices, external drives, and the like. Since then, USB has progressed into versions 2.0 and 3.0 and has become ubiquitous in computers as well as portable devices, such as smartphones, tablet computers, and MP3 players.

In general, in USB communication, one device acts as a Host while another acts as a Device. The Host powers the bus, issues commands, and generally maintains control over the connection. The Device does not initiate any activity for control of the bus. For example, a personal computer acts as a Host to a USB "thumb" drive Device.

The On-the-Go Specification allows a single Host and single Device to swap roles. For example, some tablet computers may function in a Device role and operate as a mass storage device when coupled to a personal computer Host, but may function as a Host when coupled to peripheral devices such as a keyboard.

USB hubs expand a single USB port into several so that more devices can be connected. A personal computer or automotive entertainment system, for example, may include multiple external USB ports but have an internal hub, rather than dedicated USB controllers for each port. The Flexconnect-enabled hubs (USB 2.0 and USB 3.0 hubs) produced by the Assignee of the present application are unique in the industry in that they can swap the upstream (Host) side port with one of the downstream (Device) side ports. In effect, for example, a dual role smartphone (Host/Device) can take over the hub from the downstream port. The Flexconnect feature, unique to Assignee manufactured hub devices, provides a crossbar switch on the die to reverse, for example, the USB hub host port (Port 0) and the downstream Port 1 which is where the smart phone could be connected as a USB device.

Once the USB port direction is flipped, and the smartphone is the USB Host, the remaining downstream ports are either idle or available to the smartphone acting as host. However, it is rarely the case that additional "slave" devices would need to be available to the smartphone. As such, the remaining ports are typically unused.

SUMMARY

According to various embodiments, a system is provided whereby all un-enumerated USB ports on a Hub having a dual mode port are turned into Dedicated Charging Ports (DCPs) whenever a USB port is not enumerated.

A Universal Serial Bus (USB) hub in accordance with embodiments includes a first port that is configured to be switched from a downstream port to an upstream port; a plurality of other ports; and a controller configured to switch a function of the first port from the downstream port to the upstream port responsive to a command from an attached device and further configured to switch at least one of the plurality of other ports from a data and charge port into a port dedicated to charging.

In some embodiments, the controller is configured to switch the at least one of the plurality of other ports into the port dedicated for charging if the device has not enumerated the at least one of the plurality of other ports. In some embodiments, all ports not enumerated by the device are turned into ports dedicated for charging by the controller. In some embodiments, the controller is configured to cause a short between a DP and DM line of the at least one of the plurality of other ports that was switched into a port dedicated for charging. In some embodiments, the controller is configured to switch the other port back when the first port is switched back from an upstream function to a downstream function. In some embodiments, the controller disables USB data lines to the port dedicated for charging. In some embodiments, a second port is configured to be switched from downstream to upstream.

A universal serial bus (USB) hub in accordance with embodiments includes a first port that is configured to be switched from a downstream port in a first mode to an upstream port in a second mode; a second port that is configured to be switched from an upstream port in the first mode to a downstream port in the second mode; and at least one third port configured to operate for data transfer in the first mode and as a dedicated charging port in the second mode.

In some embodiments, the USB hub includes a controller configured to switch from the first mode to the second mode responsive to a command from a device attached to the first port. In some embodiments, the controller is configured to switch the at least one third port to function as a dedicated charging port in the second mode if the at least one third port has not been enumerated by the device. In some embodiments, the controller is configured to cause a short between a DP and DM line of the at least one of the plurality of other ports that was switched into a port dedicated for charging. In some embodiments, the controller is configured to switch the at least one third port back when the first port is switched back from an upstream function to a downstream function. In some embodiments, the controller disables USB data lines to the port dedicated for charging.

A Universal Serial Bus (USB) hub in accordance with embodiments includes a plurality of ports; and a controller configured to switch a function of at least one port of the plurality of ports from a downstream port to an upstream port responsive to a command from an attached device and further configured to switch at least one other of the plurality of ports from a data and charge port into a port dedicated to charging.

In some embodiments, the controller is configured to switch the at least one other of the plurality of ports into the port dedicated for charging if the device has not enumerated the at least one other of the plurality of ports. In some embodiments, all ports of the plurality of ports not enumerated by the device are turned into ports dedicated for charging by the controller. In some embodiments, the controller is configured to cause a short between a DP and DM line of the at least one other of the plurality of ports that was switched into a port dedicated for charging. In some embodiments, the controller is configured to switch the other port back when the at least one port is switched back from an upstream function to a downstream function. In some embodiments, the controller disables USB data lines to the port dedicated for charging.

A method for operating a Universal Serial Bus (USB) hub including a plurality of ports includes switching a function of a first port of the plurality of ports from a downstream function to an upstream function responsive to a command from an attached device; and switching at least one other of the plurality of ports from a data and charge port into a port dedicated to charging.

In some embodiments, the method includes switching the at least one other of the plurality of ports into the port dedicated for charging if the attached device has not enumerated the at least one other of the plurality of ports. In some embodiments, all ports not enumerated by the device are turned into ports dedicated for charging by the controller. In some embodiments, the method includes causing a short between a DP and DM line of the at least one of the plurality of other ports that was switched into a port dedicated for charging. In some embodiments, the method includes switching the other port back or waiting until a charging device is disconnected when the first port is switched back from an upstream function to a downstream function. In some embodiments, the method includes disabling USB data lines to the port dedicated for charging.

These, and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
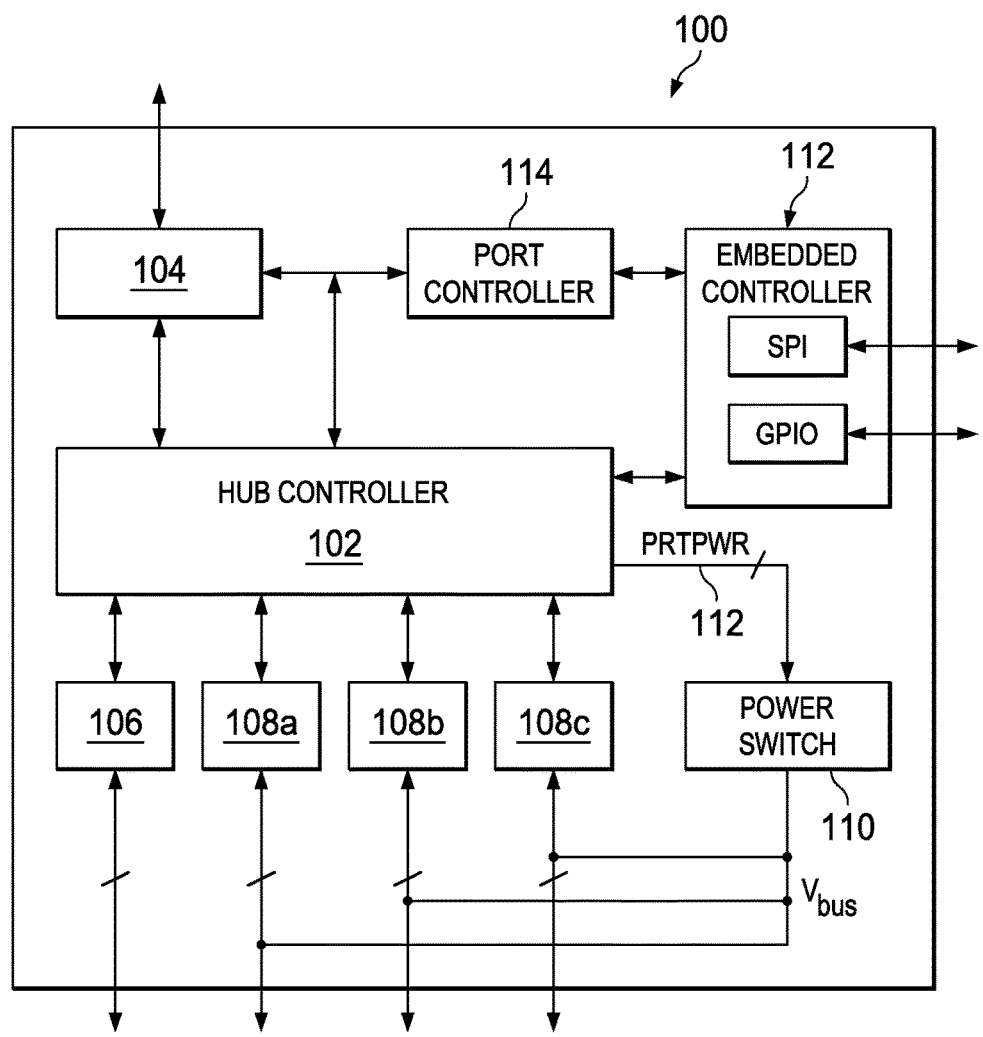
FIG. 1 is a diagram of an USB hub in accordance with embodiments.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing details of embodiments, some context for embodiments would be helpful. Most modern cars have a "head unit" that is initially the USB host to devices which are connected in the automobile. The "Head Unit" has an attached USB hub contained in an assembly called a "Break Out Box" in automotive vernacular. The Break Out Box is usually presented to the automobile occupant either in the console or the glove box where the USB hub is used to expand the number of ports available to the consumer. Various USB devices can be plugged into the hub, to play music, GPS, charge phones etc. (In USB infrastructure, there can only be a single host.). Modern smartphones have the capability to be USB 2.0 host and through software mechanisms request the "Head Unit" to reverse the USB lane and make the smart phone the "USB Host". When the USB lane is reversed these smartphones become the host, the head unit becomes the slave. This switching over of a USB port is provided by a so-called Flexconnect enabled hub, produced by the Assignee of the present application, which allows a downstream port of the hub to be swapped with an upstream port thereby allowing a master capable device to control other devices on the hub. Details on such a Flexconnect enabled hub may be found in U.S. Pat. No. 7,480,753, which is hereby incorporated by reference in its entirety as if fully set forth herein.

Broadly speaking, there are three types of USB ports:

Standard downstream ports (SDP) are defined by the USB 2.0 specification and are the ports typically found in desktop and laptop computers. The maximum load current is 2.5 mA in the suspended state, 100 mA when connected and not suspended, and 500 mA (max) when configured for that current. A device can recognize a SDP with hardware by detecting that the USB data lines, D+ and D− are separately grounded through 15 kΩ; the SDP still needs to enumerate (i.e., communicate with the device) to be USB compliant.

Charging downstream ports (CDP) are a higher current USB port for hardware such as personal computers and laptop computers. The CDP can supply up to 1.5 A, and can be supplied before enumeration. A device plugged into a CDP can recognize it with a hardware handshake implemented by manipulating and monitoring the D+ and D− lines. This test takes place before turning the data lines over to the USB transceiver, which allows a CDP to be detected (and charging to begin) before enumeration.

Dedicated charging port (DCP) are power sources like wall plugs and auto adapters that do not enumerate. Charging can occur with no digital communication at all. DCPs can supply up to 1.5 A and are identified by a short between D+ to D−.

As will be discussed in greater detail below, in embodiments, ports of a dual mode hub that are not enumerated can be configured as dedicated charging ports.

Turning now to the drawings and with particular attention to FIG. 1, a block diagram illustrating an example of a USB hub 100 in accordance with embodiments is shown. In the example illustrated, the hub 100 includes a hub controller 102 for implementing the switching over of the data to and from ports on the hub. In addition, the hub controller 102 may change the functionality of one or more ports from upstream to downstream and vice versa. For example, the hub controller 102 may be operable to intelligently route information from the host port to the appropriate target device and vice-versa; additionally, the hub controller 102 may be operable to resolve signal conflicts and collisions, e.g., signals sent from multiple devices at substantially the same time.

The hub 100 further includes a first dual mode port 104 whose default is functioning as an upstream host port, but which may be switched to a downstream port function. In addition, a dual mode port 106 is provided, whose default is as a downstream port but which may be switched to an upstream port function. In addition, a plurality of downstream ports 108a-108c are provided, which may function as downstream ports but may be switched to operate in a dedicated charging port mode when the port 104 and port 106 switch modes. It is noted that, in some embodiments, any or all of the other ports 108a-108c may also switch from downstream to upstream functioning.

The hub 100 may include a port controller 114 which may supervise port functionality and cause the controller 102 to implement the switching of data and port functions. In some embodiments, an additional port is available to an embedded controller 112 which may implement SPI or GPIO functions. Finally, a power switch 110 is provided under control of the port and/or hub controller, which provides power on the Vbus lines to the port interfaces.

In various embodiments, the USB hub 100 may be any of various hubs. For example, the USB hub 100 may be an external hub, e.g., one whereby a host device may control one or more other devices coupled to the hub. In one embodiment, the USB hub 100 may be a root hub. Additionally, or alternatively, the USB hub 100 may be included in another device or computer system. For example, a device such as a smartphone may connect directly to a hub included in a personal computer. Additionally, or alternatively, a device such as a smartphone may itself include a USB hub for connecting to other USB devices. In one embodiment, the USB hub may include or be a portion of a USB composite or compound device, such as an automotive head unit.

The USB hub 100 may further include additional interfaces (not shown). For example, the USB hub 100 may include physical (PHY) interfaces, and/or other interfaces, e.g. USB 2.0 Transceiver Macrocell Interface (UTMI) or UTMI+ Low Pin Interface (ULPI), among others.

In operation, a device such as a smartphone may couple to port 106 and send one or more commands requesting a switchover from downstream (Device) functionality to upstream (Host) functionality. At that time, the port controller 114 causes the hub controller 102 to switch the port 104 to downstream function and switch the port 106 to an upstream function. In this switch command, there are additional bytes of data that can be used to disable a downstream port and configure the disabled port as a dedicated charger port. As will be explained in greater detail below, it does so by "disconnecting" data lines from the associated ports so that only Vbus and GND are connected from the power switch 110 and controlling the power switch via the power command line 113 to deliver power to the appropriate port.

Figure 2:
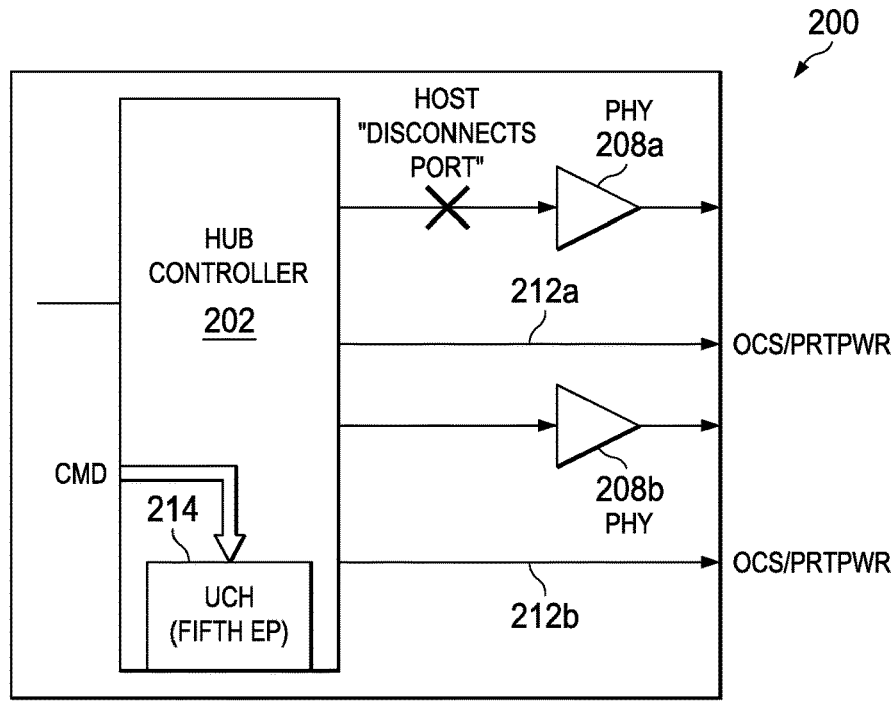
FIG. 2 is diagram of example operation of hub ports in accordance with embodiments.

This operation is shown in greater detail in FIG. 2. Shown is a hub controller 202 coupled to a plurality of physical layer transceivers 208a, 208b and associated OCS/PRTPWR control lines 212a, 212b. In operation, when a CMD command is received at the I/O interface 214, the hub controller 202 will cause the corresponding PHY transceiver(s) 208a, 208b to be disconnected. However, commands over the corresponding OCS/PRTPWR will cause the power switch (FIG. 1) to deliver power to the corresponding interface.

Figure 3:
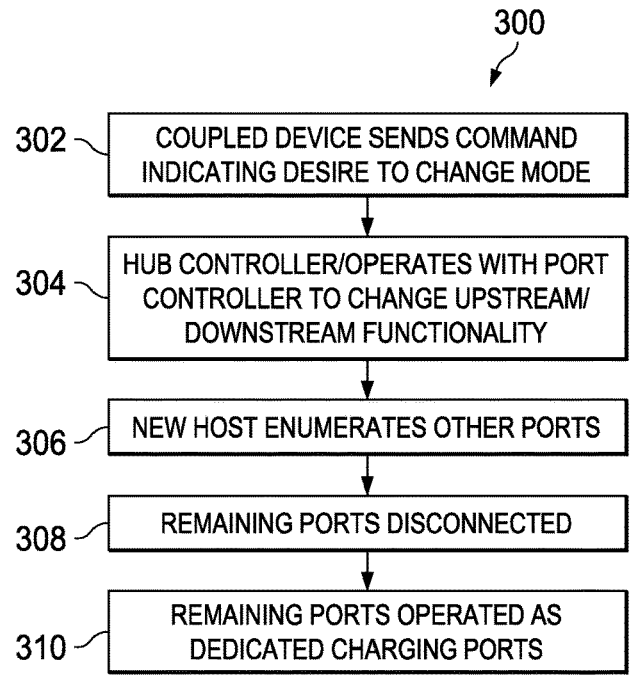
FIG. 3 is a flowchart illustrating operation of embodiments.

Turning now to FIG. 3, a flowchart illustrating operation of an embodiment for switching to a dedicated charging port mode is shown. In various embodiments, some of the method elements shown may be performed concurrently, in a different order than shown, or may be omitted. Additional method elements may also be performed as desired. As shown, this method may operate as follows.

In a step 302, a command is received from a coupled device that a change of mode is desired. For example, this may include a specifying a change in control of one or more devices coupled to the USB hub 100 (e.g., via ports 108a-108c) by a first device, e.g., coupled to the first port 104, to control by a second device, e.g., coupled to the second port 106. For example, following the descriptions above, if one of the devices is a dual-role device, it may request, or be instructed, to act as the host controller of the USB hub 100. In this example, the input may be received from any of a variety of sources, and may set or invoke a switching condition, which may then be detected by the USB hub 100.

In some embodiments, the switching condition may be invoked mechanically, such as, for example, by flipping, i.e., switching on or off, a mechanical switch on the USB hub, or, alternatively, if the USB hub 100 is included in a device, a switch on the device. Alternatively, or additionally, a user or other system may invoke the switching condition via electronic means; for example, the user may choose from a plurality of possible buttons or options, e.g., depending on the number of devices coupled to the USB hub 100. For example, if the USB hub 100 is included in a peripheral device, e.g., a cell phone, PDA, and/or a digital music player, among others, the user may be presented with a plurality of options on the display of the peripheral device and may invoke the switching condition by selecting one or more of the available options. More specifically, the peripheral device may include a menu associated with the USB hub 100; the user may select this menu, e.g., via a stylus, voice activation, and/or a keypad, among others means, and select from one or more options to invoke a specific change in host, e.g., by invoking the switching condition. Alternatively, the user may invoke the switching condition, e.g., similar to methods described above, among others, from a device coupled to the USB hub 100.

In some embodiments, the USB hub 100 may automatically detect the switching condition. For example, the USB hub 100 may have a sensing mechanism, e.g., present in the physical layer (PHY) of connections to the USB hub 100, specifically for detecting the switching condition. In one embodiment, the switching condition may include a change of impedance in one or more pins of one of the connections to the USB hub 100, e.g., one or more of the ports. For example, in one embodiment, the invoked switching condition, e.g., via the means described above, may include a change in impedance on the D+ and D− pins of the USB cable, e.g., connected to the peripheral device that is requesting logic reversal. As a specific example, normally two of the pins in the PHY may have an impedance of 15 kOhms, and after tying, for example, two pins together, the impedance may decrease to 7.5 kOhms. Correspondingly, the USB hub 100 may detect this change in impedance as the switching condition. Thus, the USB hub 100 may receive input invoking a switching condition indicating a change in logic in the hub.

In step 304, the hub controller 102 in the USB hub 100 may be switched from receiving information from the first port 104, i.e., coupled to the old host controller, to receiving information from the second port 106, i.e., coupled to the new host controller. In other words, the USB hub 100 may change control of the devices coupled to the hub from one device to another in response to the received input, e.g., the inputs described above.

In some embodiments, the hub 100 may also allow the old host controller to act as a peripheral device to the new host controller. Thus, the upstream and downstream functionality may be effectively switched between a host controller and a device. Correspondingly, in various embodiments, the new host controller may act as host to other devices, e.g., possibly including the old host controller, coupled to the hub 100.

In a step 306, the new host may enumerate one or more of the other ports 108a-108c. That is, once the changeover to the new host is done, the hub 100 will report the presence of any peripherals on the ports 108a-108c to the new host. The new host may then cause the device(s) to reset and then perform one or more communications with the device to learn about the device, set configurations, and load device drivers.

During this process, the new host may identify which ports are available and send one or more commands to the hub controller 102 to reconfigure them, i.e., to change mode to function as Dedicated Charging Ports. It is noted that such a command may be similar to the initial change mode (new host) command discussed above and may be issued or signaled in a similar manner. In some embodiments, the initial change mode command is also the command that causes the changeover of any non-enumerated ports to dedicated charging ports.

In step 308 the non-enumerated ports are "disconnected" using associated disable circuitry (not shown). Finally, in step 310, the non-enumerated ports are now available as dedicated charging ports. That is, the power switch 110 will deliver power to the Vbus lines of the corresponding port as if the port were a power charging interface, like a wall outlet interface. It is noted that the ports that have been enumerated may still perform a charging function as standard downstream ports or charging downstream ports.

Figure 4:
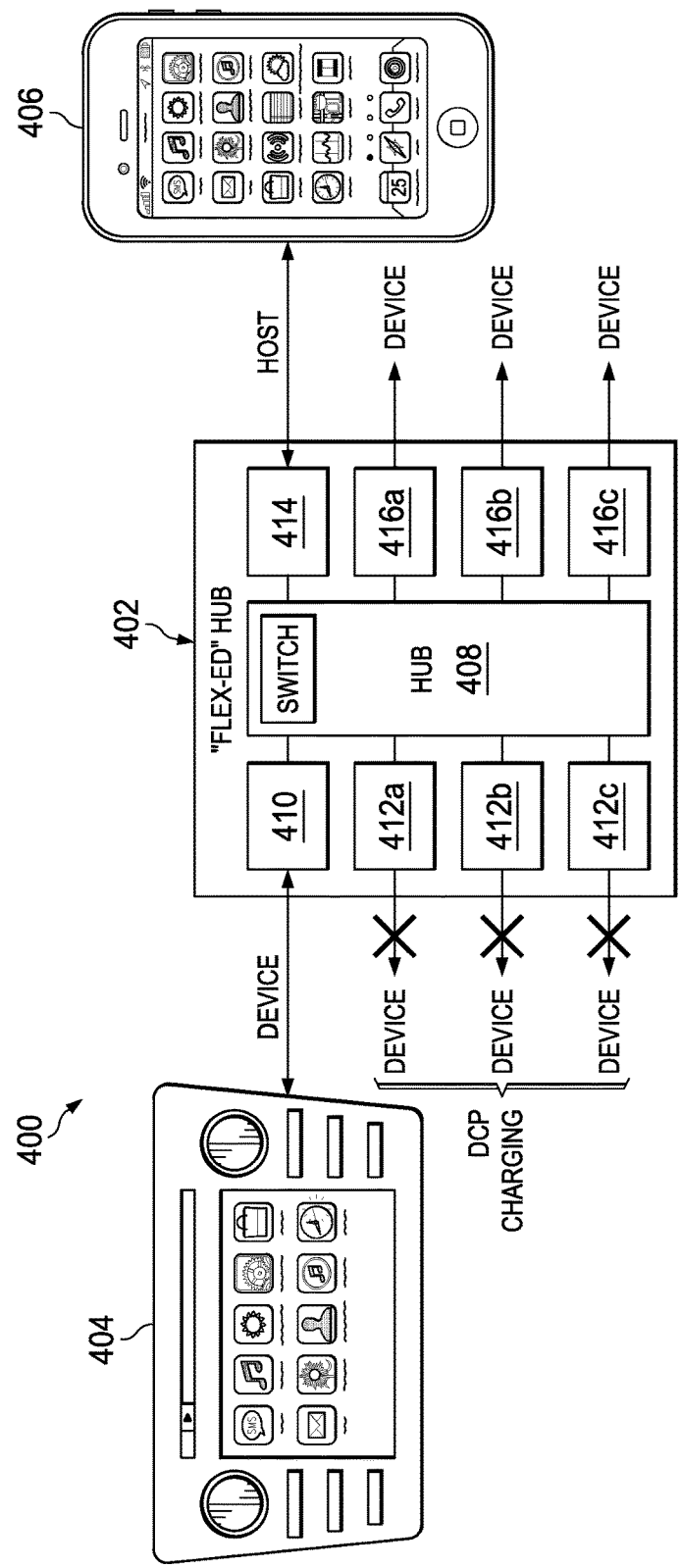
FIG. 4 is a diagram of a system including a hub in accordance with embodiments.

As noted above, embodiments may be employed in a variety of contexts. FIG. 4 is a diagram illustrating a hub in accordance with embodiments in an automotive environment 400. System 400 includes a hub 402, a primary host 404 and a secondary host 406. In the embodiment illustrated, the primary host 404 may be embodied as an automotive infotainment system. The secondary host 406 may be embodied as a smartphone, PDA, tablet computer, or similar dual mode-capable device. In the embodiment illustrated, the hub 402 includes a switching or hub controller 408, a first reversible port 410, a second reversible port 414, and ports 412a-412c and 416a-416c. In the embodiment illustrated, the ports 416a-416c are standard downstream ports and ports 412a-412c are convertible ports, i.e., that may be converted from functioning in a downstream mode to functioning in a dedicated charging port mode. It is noted that in other embodiments, different numbers of ports may be provided. Furthermore, in some embodiments, more than two ports may be reversible.

In operation, the device 406 may couple to port 414 and request a change of mode or port reversal as discussed above. In such a case, the ports 412a-412c may be available as dedicated charging ports if they have not been enumerated by the new host, as discussed above.

In addition to the automotive context, embodiments may also be used in other environments where a device is coupled to another USB device that has free ports. For example, a hub according to embodiments may be provided in a laptop computer docking station or associated with a peripheral such as a computer monitor or keyboard.

Figure 5:
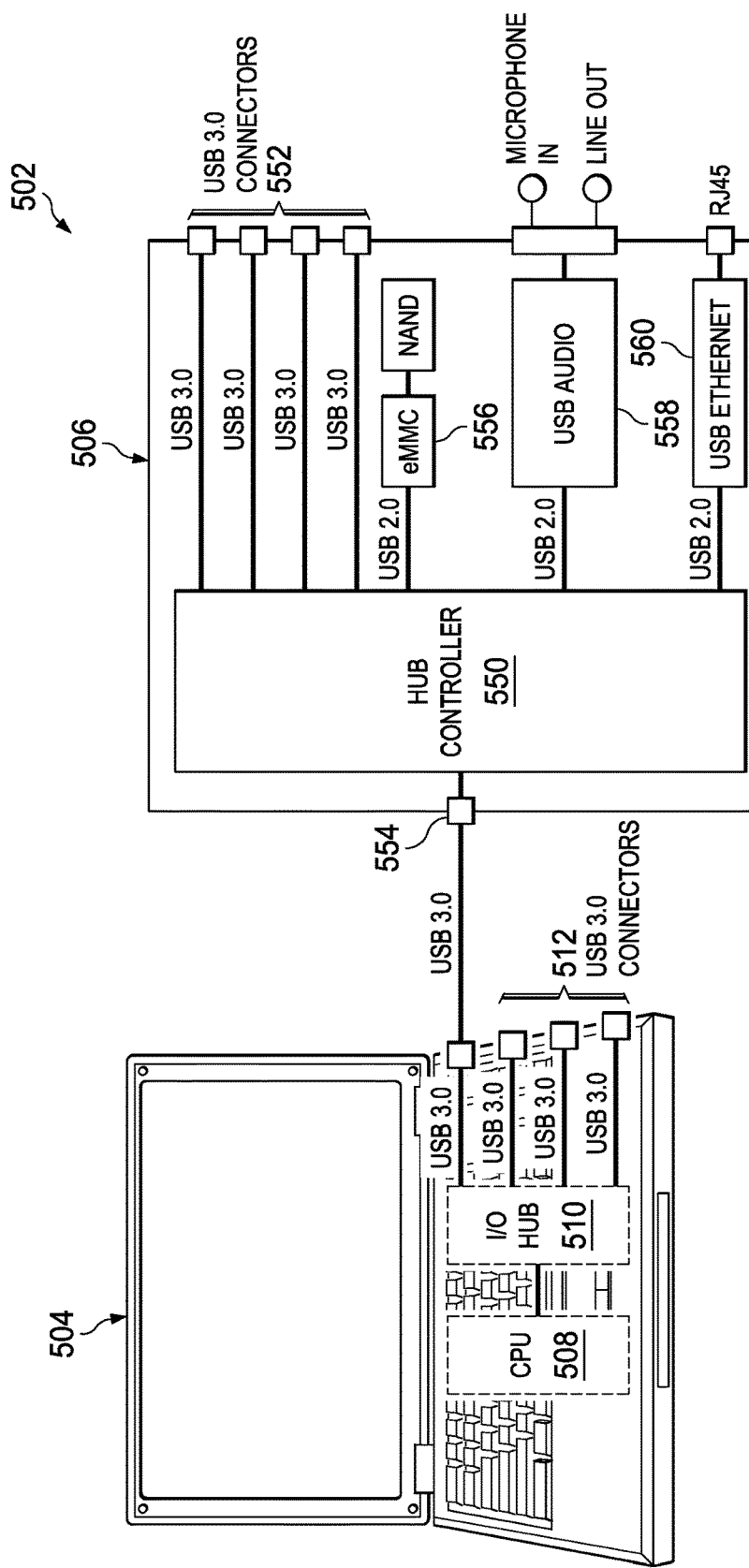
FIG. 5 is a diagram of a system in accordance with embodiments.

Such a system is shown, for example in FIG. 5. The system 500 includes a computer 504, such as a laptop computer, and a peripheral 506, such as a docking station or monitor. The computer 504 includes a CPU 508; a USB I/O hub 510 including ports 512. One of the ports 512 couples the computer 504 to a corresponding port 554 on the peripheral 506.

The peripheral 554 may include a hub controller 550 and one or more external USB ports 552. It may further include an EMM USB port 556, a USB audio port 556, and a USB Ethernet port 560. In accordance with embodiments, the computer 504 may function as a host when connected with the peripheral 506. The computer 504 may request that ports 552 be made available as dedicated charging ports, in a manner similar to that discussed above. In addition, in some embodiments, the additional ports 512 of the laptop computer may be used as charging ports.

What is claimed is:

1. A Universal Serial Bus (USB) hub comprising:
a first port that is configured to be switched from a downstream port to an upstream port;
a plurality of other ports; and
a controller circuit configured to switch a function of the first port from the downstream port to the upstream port responsive to a command from an attached device and further configured to switch at least one of the plurality of other ports from a data and charge port into a port dedicated to charging responsive to the command.

2. The USB hub according to claim 1, wherein the controller circuit is configured to switch the at least one of the plurality of other ports into the port dedicated for charging if the device has not enumerated the at least one of the plurality of other ports.

3. The USB hub according to claim 1, wherein all ports not enumerated by the device are turned into ports dedicated for charging by the controller circuit.

4. The USB hub according to claim 1, wherein the controller circuit is configured to cause a short between a DP and DM line of the at least one of the plurality of other ports that was switched into a port dedicated for charging.

5. The USB hub according to claim 1, wherein the controller circuit is configured to switch the other port back when the first port is switched back from an upstream function to a downstream function.

6. The USB hub according to claim 1, wherein the controller circuit is configured to disable USB data lines to the port dedicated for charging.

7. The USB hub according to claim 1, further including a second port configured to be switched from downstream to upstream.

8. A universal serial bus (USB) hub, comprising:
a first port that is configured to be switched from a downstream port in a first mode to an upstream port in a second mode;
a second port that is configured to be switched from an upstream port in the first mode to a downstream port in the second mode; and at least one third port configured to operate for data transfer in the first mode and as a dedicated charging port in the second mode.

9. The USB hub of claim 8, further including a controller circuit configured to switch from the first mode to the second mode responsive to a command from a device attached to the first port.

10. The USB hub of claim 9, wherein the controller circuit is configured to switch the at least one third port to function as a dedicated charging port in the second mode if the at least one third port has not been enumerated by the device.

11. The USB hub according to claim 8, wherein the controller circuit is configured to cause a short between a DP and DM line of the at least one of the plurality of other ports that was switched into a port dedicated for charging.

12. The USB hub according to claim 8, wherein the controller circuit is configured to switch the at least one third port back when the first port is switched back from an upstream function to a downstream function.

13. The USB hub according to claim 8, wherein the controller circuit is configured to disable USB data lines to the port dedicated for charging.

14. A Universal Serial Bus (USB) hub comprising:
a plurality of ports;
a controller circuit configured to:
switch a function of at least one port of the plurality of ports from a downstream port to an upstream port responsive to a command from an attached device; and
responsive to the command, switch at least one other of the plurality of ports from a data and charge port into a port dedicated to charging.

15. The USB hub according to claim 14, wherein the controller circuit is configured to switch the at least one other of the plurality of ports into the port dedicated for charging if the device has not enumerated the at least one other of the plurality of ports.

16. The USB hub according to claim 14, wherein all ports of the plurality of ports not enumerated by the device are turned into ports dedicated for charging by the controller circuit.

17. The USB hub according to claim 14, wherein the controller circuit is configured to cause a short between a DP and DM line of the at least one other of the plurality of ports that was switched into a port dedicated for charging.

18. The USB hub according to claim 14, wherein the controller circuit is configured to switch the other port back when the at least one port is switched back from an upstream function to a downstream function.

19. The USB hub according to claim 14, wherein the controller circuit is configured to disable USB data lines to the port dedicated for charging.

20. A method for operating a Universal Serial Bus (USB) hub including a plurality of ports, the method comprising:
switching a function of a first port of the plurality of ports from a downstream function to an upstream function responsive to a command from an attached device; and
responsive to the command, switching at least one other of the plurality of ports from a data and charge port into a port dedicated to charging.

21. The method of claim 20, further including switching the at least one other of the plurality of ports into the port dedicated for charging if the attached device has not enumerated the at least one other of the plurality of ports.

22. The method of claim 20, wherein all ports not enumerated by the device are turned into ports dedicated for charging by the controller.

23. The method of claim 20, including causing a short between a DP and DM line of the at least one of the plurality of other ports that was switched into a port dedicated for charging.

24. The method of claim 20, further including switching the other port back or waiting until a charging device is disconnected when the first port is switched back from an upstream function to a downstream function.

25. The method of claim 20, including disabling USB data lines to the port dedicated for charging.

* * * * *